2,717,546

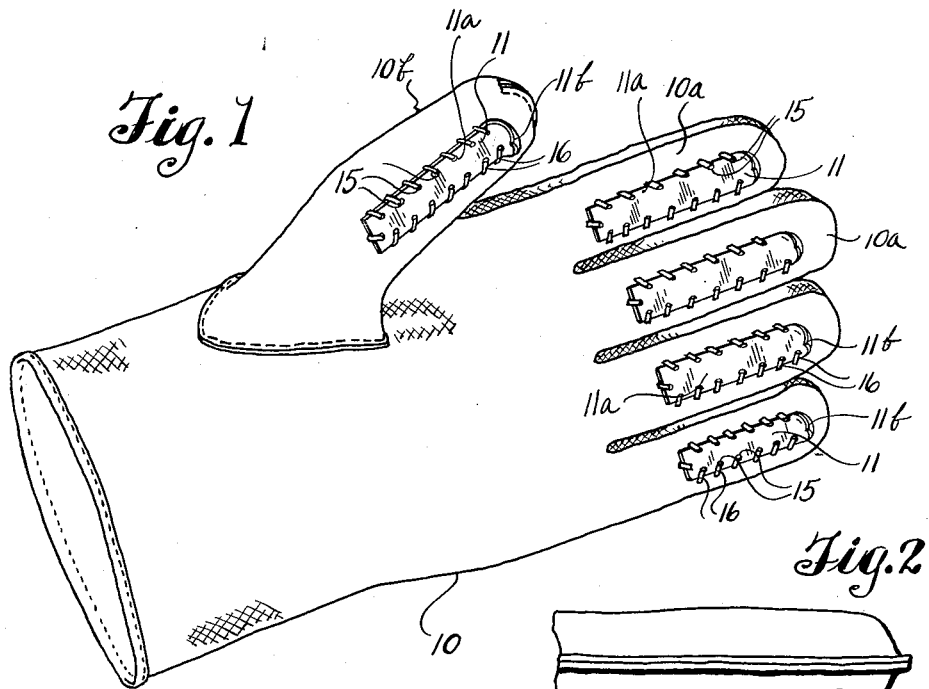
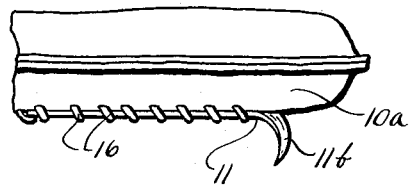
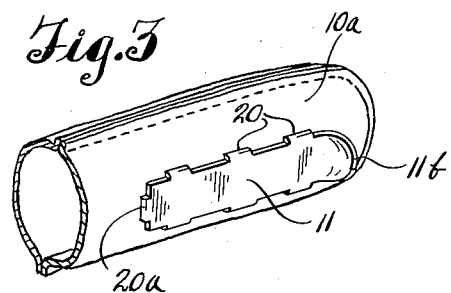
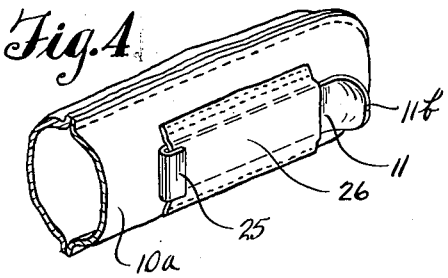
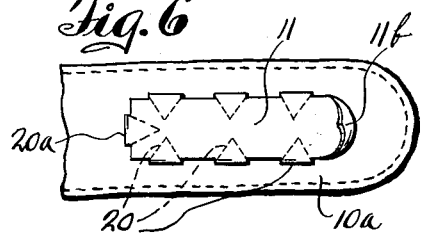
INVENTOR.
CARL EDWIN RYDEN Patented Sept. 13, 1955

GARDENER'S GLOVE

Carl Edwin Ryden, Seattle, Wash.

Application May 22, 1950, Serial No. 163,498

2 Claims. (Cl. 97—63)

This invention relates to a special purpose glove and it has reference more particularly to a glove with claws applied to the fingers and thumb thereof whereby it is especially adapted for work associated with gardening.

It is the principal object of my invention to eliminate or minimize the requirement for use of garden tools such as trowels or small rakes when working around small plants and flowers in the garden, by the provision of my special purpose glove, which may be kept on the hand and readily available for digging and raking in the dirt, or for other uses without interference in handling other tools.

Another object of my invention is to provide a "claw glove" for work in the garden which protects the hands of the wearer and which has definite advantages when used in performing tasks such as garden weeding, planting and raking.

A further object of my invention is to provide claw like devices that may be easily and readily secured to the fingers and thumb of a glove; which devices are formed from thin pliable metal, or the like, so as to not interfere with the necessary bending or other movements of the hands or fingers.

Other objects of my invention reside in the details of construction of parts, in their combination and in their mode of use as will hereinafter be more fully described.

In accomplishing these and other objects of the invention, I have provided the improved details of construction, the preferred forms of which are illustrated in the accompanying drawings, wherein—

Fig. 1 is a perspective view of a glove with the present claws or digging devices secured to the four fingers and thumb thereof.

Fig. 2 is an enlarged side view of one finger of the glove illustrating one means of applying a claw thereto.

Figs. 3 and 4 illustrate a single finger of a glove and respectively, show alternative means of securing the claw to the glove fingers and thumb.

Fig. 5 is an end view of the glove finger with a claw secured as illustrated in Fig. 3.

Fig. 6 illustrates the claw device shown in Fig. 3 and in dotted line shows the clips for securing the claw device to the glove.

When working in and around the garden, it is the usual practice to use relatively small garden tools made for this particular purpose but even such tools are not entirely satisfactory and oftentimes the worker resorts to digging or raking with his fingers. This is especially true when working around small plants or in crowded flower beds. My invention embodies means whereby the worker may use his hands, in place of tools, more efficiently and with less danger of receiving scratches or other injuries.

Referring more in detail to the drawings—

In Fig. 1, I have illustrated a typical work glove, which may be made of canvas or light weight leather, which I have designated in its entirety by reference numeral 10. The particular style or shape of the glove and material from which it is made, are not features of my invention.

Attached to the fingers 10a and thumb 10b which constitute the digital portions of the glove are claws or rake like devices 11 which are in the form of thin plates that extend lengthwise of the fingers to approximately the ends thereof.

The size and shape of the claw may be varied as desired or required without departing from the teaching of my invention. I prefer to make the claws from thin, steel strips which are approximately one-half inch in width. The thickness of the metal is an important feature as will be presently pointed out. The length of the body portion 11a may vary somewhat but it is preferable to have the body portion substantially the length of the glove finger. This provides additional protection to the user's hand and the ends of the fingers.

Formed at the outer end of the body portion of the metal strip or plate and integral therewith is a hook or claw 11b which curves away from the finger and is slightly backturned. Preferably the claw is tapered to form a relatively sharp point at the very end. When the device is applied to the glove finger, the claw curves outwardly extending at approximately right angle to the finger and body portion 11a.

There are several ways by which the claw plates or strips may be applied to the glove fingers and thumb. In Figs. 1, 3 and 4 I have shown three alternatives but the particular manner of application or attachment is not a feature upon which I base my invention. In Figs. 1 and 2, the plate is provided with holes 15 formed at spaced intervals along the outer edges of the body portion 11a and the plate is secured to the glove by means of sewing whereby thread or cord 16 is passed through the holes and adjacent portion of the glove finger.

An alternative manner of application is shown in Figs. 3, 5 and 6. Wherein the plate is formed with laterally extending barbs or teeth 20 formed as parts thereof which are adapted to be pressed through the material of the glove finger and clinched. A clip 20a is also provided at the inner end of the body portion, opposite the claw, to retain the device against endwise movement.

The third alternative manner of application illustrated in Fig. 4 shows the claw plate to comprise a straight body portion, without holes or clips, formed at its inner end with an outwardly turned flange 25 which is adapted to be bent back toward the body portion. If a device of this construction is to be used, a fabric sleeve 26 is secured longitudinally to the fingers and thumb, the sleeve being of approximately the same length and width as the body portion. The body portion of the device is extended beneath the sleeve and clamped to the rearward end thereof by means of pressing the flange 25 tightly against the adjacent portion of the sleeve.

There may be securing means, other than those described which are equally as satisfactory but as previously stated, the manner of application is not a feature of my invention.

With the claw or rake device so constructed and assembled in combination with a glove, it has many uses and advantages over commonly used garden tools. One fact is that the wearer is always prepared to dig or rake and he need not hunt for a misplaced tool. Also, it is easier to accomplish the task of weeding and cleaning out of the flower beds. Work can be done with a single finger or with a group of fingers as required.

It is further to be pointed out and understood that for the efficient and most satisfactory use of my invention, the rake like claws must be formed from light weight, relatively flexible metal so that the wearer may bend his fingers and have substantially unrestricted movement thereof. Also if deemed necessary, the claws 11b could be hardened to give them greater strength and stiffness.

Having thus described my invention, what I claim as new therein and desire to secure by Letters Patent, is—

1. A gardener's glove having narrow resilient strips secured flatly to the digital portions thereof and extending therealong on the palm side of the glove; said strips being resistant to wear and of such length as to bridge the joints of the digits of tthe human hand as applied to the glove and adapted to be flexed in accordance with and by the flexing of the fingers of the hand as contained in the glove and terminating at their outer ends in ground clawing hooks that are located directly beneath the nodes of the distal end portions of the digits of the hand as applied to the digital portions of the glove.

2. A glove as recited in claim 1 wherein said metal strips are equipped at their longitudinal edges with prongs adapted to be projected through the material of the fingers and thumb portions and clinched for their securement.

References Cited in the file of this patent

UNITED STATES PATENTS

| | | |
|---|---|---|
| 275,463 | Burnes | Apr. 10, 1883 |
| 467,364 | Breen | Jan. 19, 1892 |
| 909,018 | Paxton | Jan. 5, 1909 |

FOREIGN PATENTS

| | | |
|---|---|---|
| 323,863 | Great Britain | Jan. 16, 1930 |